Patented Oct. 24, 1933

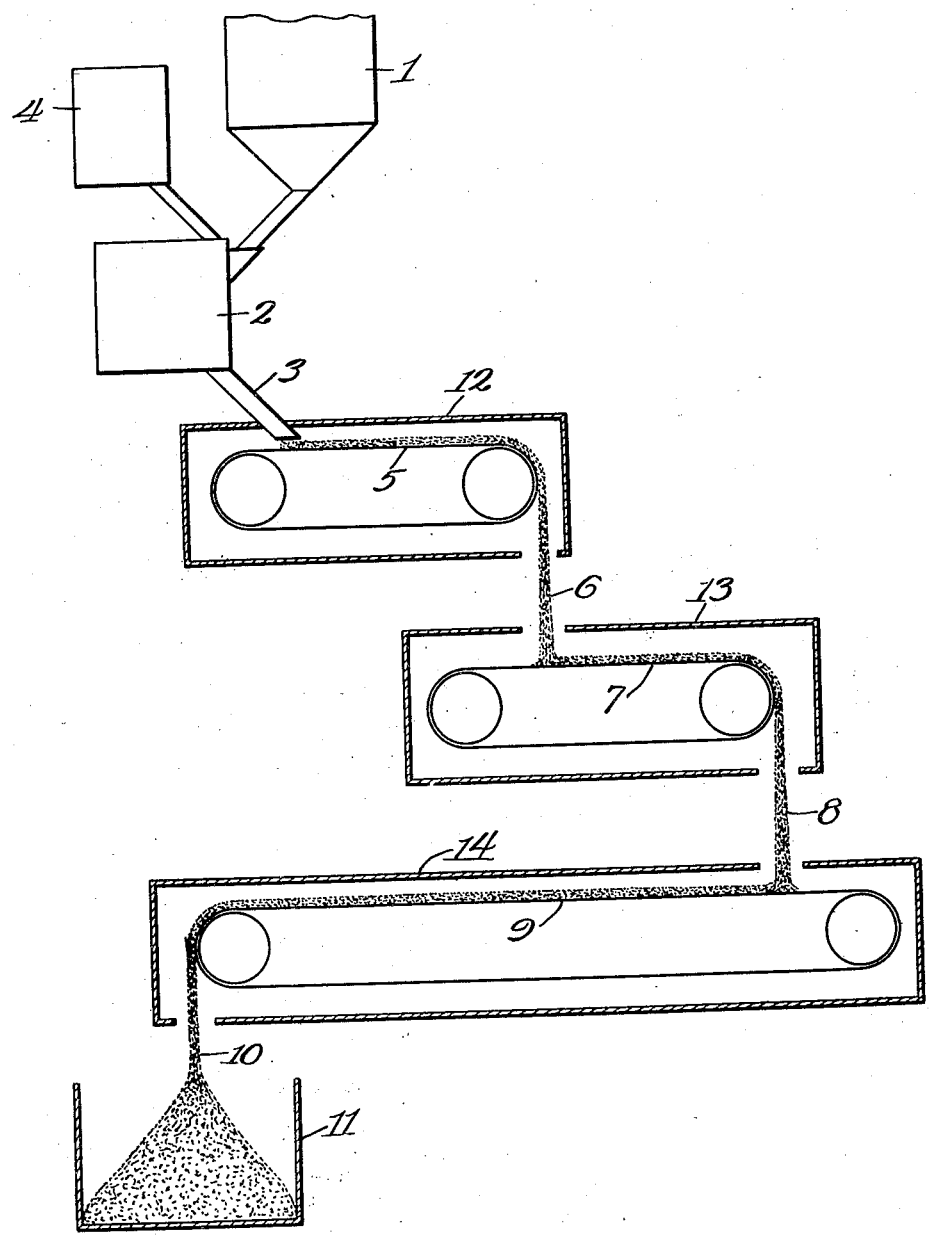

1,931,754

UNITED STATES PATENT OFFICE 1,931,754

APPARATUS FOR COLORING AND DRYING ROOFING GRANULES

Paul S. Denning, Joliet, Ill.

Original application March 3, 1930, Serial No. 432,634. Divided and this application February 26, 1931. Serial No. 518,437.

2 Claims. (Cl. 91—55)

This invention is a division of my application, Serial No. 432,634, filed March 3, 1930. It has for its objects to prevent the agglomeration, caking and sticking of roofing granules in the process of their manufacture; to avoid rough and violent handling of the granules; to obviate the necessity of raking and stirring which frequently wears and abrades the color coat from the granule; and to produce drying means which will be automatic, simple, and effective and will avoid all excessive handling or stirring which hitherto has damaged the product.

These and other objects will become apparent from the specification and the annexed drawing in which the figure indicates diagrammatically the plant in which the granules are produced.

In the application of which this is a division and in other companion cases, I have set forth certain cements and bonding agents which hold the color coating to the granule. In general, it may be stated that these and other granule coatings which are known to the trade are initially cementitious or gummy and usually are suspensions from which the liquid must be evaporated before the granule is usable. The coatings as they dry become sufficiently adhesive to cement the whole mass of granules together into a solid cake, and measures must be taken to prevent this occurrence. In consequence, it is customary to pour the granules out upon a raking floor and to rake or stir them while the drying is progressing. Certain of the cementing agents must be made insoluble, and it is also customary to heat the granules to a relatively high temperature to change the chemical nature of the coating by a heat reaction.

I have found that such heating is deleterious since the color itself is often damaged by the heat, and, too, it is costly. I prefer, therefore, to use bonding agents which will set properly at temperatures lower than that which injures the coloring pigment, and I find that when the coated granules are subjected to a mild drying temperature, they can be broken apart and segregated with relatively little handling. This again is advantageous since the color is not worn off by the abrading action of other granules.

With reference to the drawing, the part 1 indicates a storage bin in which the supply of ground rock is kept. This is carefully freed from dust and screened to the proper size. The part 4 indicates a bin or tank in which the coloring material is stored. This is usually a suspension in water, but the water may be added directly in the mixer 2. Selected proportions of granules and color coating are allowed to run through the connecting conduits and are mixed mechanically in the mixer 2 which may be of any of the well known types. From the mixer, the coated granules are run through the conduit 3 upon a moving belt 5 which is located in the heating chamber or oven 12. When the granules come to the end of the belt, they fall, as shown at 6, through a considerable space into an opening in a second heating and drying chamber 13 and onto a second moving belt 7. Again, as shown, the granules fall as indicated at 8 through an opening in a third drying chamber 14 and onto a third belt 9. From there they may be discharged, as at 10, into a storage bin 11. I have found that the stirring due to the drops 6, 8 and 10, combined with the drying due to the mild temperature maintained within the chambers 12, 13 and 14 is sufficient to prevent any sticking or agglomeration of the granules.

It is, of course, understood that the representation is diagrammatic, and that any convenient form of drying chamber may be used and any form of conveyor may be employed for the parts 5, 7 and 9. Also, the number of drying chambers and drops depends very largely upon the nature of the bonding and cementing agent selected, but it is believed that a sufficient organization has been set forth to show and to disclose fully the principle on which this invention operates.

What I claim, therefore, is:

1. In combination, a storage bin for containing granules, a receptacle for containing color coating material for said granules, a mixer for receiving granules and coating material from said bin and receptacle and for mixing the same for coating said granules, a plurality of independent drying chambers at different levels below said mixer, means for conducting the coated granules from said mixer to one of said drying chambers, means in each chamber for conducting said material through the same, said chambers being arranged one below the other whereby said coated material may fall through the air from one dryer chamber to the one next below for preventing agglomeration of said coated granules.

2. A method of applying a color coating to roofing granules comprising mixing a fluid composition containing color pigments and a binder with said granules alternately passing the mixed mass through a series of individual drying ovens and causing the mass to fall by gravity through the air from each oven to the next succeeding one of the series for drying and for preventing agglomeration of the coated granules and finally depositing said granules in a receptacle.

PAUL S. DENNING.